(12) United States Patent
Tu et al.

(10) Patent No.: US 9,164,617 B2
(45) Date of Patent: Oct. 20, 2015

(54) INTELLIGENT GUI TOUCH CONTROL METHOD AND SYSTEM

(75) Inventors: Yen-Hung Tu, Taipei (TW); Chung-Lin Chia, Zhongli (TW); Han-Chang Chen, New Taipei (TW); Wen-Chieh Pan, New Taipei (TW)

(73) Assignee: Rich IP Technology Inc., Taipei (TW)

( * ) Notice: Subject to any disclaimer, the term of this patent is extended or adjusted under 35 U.S.C. 154(b) by 216 days.

(21) Appl. No.: 13/288,818

(22) Filed: Nov. 3, 2011

(65) Prior Publication Data

US 2013/0088457 A1    Apr. 11, 2013

(30) Foreign Application Priority Data

Oct. 6, 2011   (TW) .............................. 100136229 A (51) Int. Cl.
| | | |
|---|---|---|
| *G06F 3/048* | (2013.01) | |
| *G06F 3/041* | (2006.01) | |
| *G06F 3/0488* | (2013.01) | |

(52) U.S. Cl.
CPC .......... *G06F 3/0416* (2013.01); *G06F 3/04886* (2013.01)

(58) Field of Classification Search
CPC ................ G06F 2203/04808; G06F 3/04886; G06F 3/016; G06F 2203/014; G06F 3/03547; G06F 3/0416; G06F 2203/04101; G06F 3/011; G06F 3/0412; G06F 3/044; G06F 3/04847; G06F 2203/048; G06F 2203/04809; G06F 2203/0426; G06F 2203/04886; G06F 3/048; G06F 3/0426
USPC ...................... 345/76–204; 178/18.01–18.11; 715/762, 763, 764, 773, 862
See application file for complete search history.

(56) References Cited

U.S. PATENT DOCUMENTS

| | | | | |
|---|---|---|---|---|
| 6,567,109 | B1* | 5/2003 | Todd .............................. | 715/862 |
| 6,882,337 | B2* | 4/2005 | Shetter .......................... | 345/173 |
| 7,489,306 | B2* | 2/2009 | Kolmykov-Zotov et al. . | 345/173 |
| 8,013,839 | B2* | 9/2011 | Ording et al. .................. | 345/157 |
| 2004/0075671 | A1* | 4/2004 | Vale et al. ...................... | 345/660 |
| 2004/0136564 | A1* | 7/2004 | Roeber et al. ................. | 382/100 |
| 2005/0012723 | A1* | 1/2005 | Pallakoff ........................ | 345/173 |
| 2006/0022956 | A1* | 2/2006 | Lengeling et al. ............ | 345/173 |
| 2009/0309851 | A1* | 12/2009 | Bernstein ....................... | 345/174 |
| 2010/0083190 | A1* | 4/2010 | Roberts et al. ................ | 715/863 |
| 2010/0227689 | A1* | 9/2010 | Brunet De Courssou et al. ............................... | 463/37 |
| 2010/0235793 | A1* | 9/2010 | Ording et al. ................. | 715/863 |

(Continued)

OTHER PUBLICATIONS

Ryan Haveson & Ken Sykes, Writing DPI-Avvare Win32 Applications, Sep. 2008, Microsoft Corporation.*

*Primary Examiner* — Kent Chang
*Assistant Examiner* — Herbert L Hagemeier
(74) *Attorney, Agent, or Firm* — Tracy M. Heims; Apex Juris, Pllc (57) ABSTRACT

An intelligent GUI touch control method and system, the method includes the steps of: generating at least one masking plane according to a GUI, wherein the GUI includes at least one option object, the masking plane has at least one masking block corresponding to the at least one option object, the masking block has a plurality of sub-blocks, and each of the sub-blocks has a weighting coefficient; reading a sensed data array from a touch panel; and performing a weighting operation according to the at least one masking plane and the sensed data array, so as to make each of the at least one option object correspond to at least one weighted value, and determine at least one target object among the at least one option object according to the at least one weighted value.

17 Claims, 5 Drawing Sheets

(56) References Cited

U.S. PATENT DOCUMENTS

| | | | |
|---|---|---|---|
| 2010/0289754 A1* | 11/2010 | Sleeman et al. | 345/173 |
| 2010/0315266 A1* | 12/2010 | Gunawardana et al. | 341/22 |
| 2010/0315372 A1* | 12/2010 | Ng | 345/174 |
| 2011/0096010 A1* | 4/2011 | Todoroki | 345/173 |
| 2011/0320978 A1* | 12/2011 | Horodezky et al. | 715/823 |

* cited by examiner

INTELLIGENT GUI TOUCH CONTROL METHOD AND SYSTEM

BACKGROUND OF THE INVENTION

1. Field of the Invention

The present invention relates to a touch control method and system, especially to an intelligent GUI touch method and system.

2. Description of the Related Art

Prior art touch control methods generally use an X-Y sensor array to detect a touch coordinate, and then transmit the touch coordinate to activate a corresponding function. However, when the X-Y sensor array is of a large size, the generation of the touch coordinate can take much time, and the activation of the corresponding function can be therefore too late to keep up with a user's touch operation.

Besides, as prior art touch control methods use the transmission of the touch coordinate to activate an object function, therefore, when there are multiple objects—for example a GUI(Graphical User Interface) virtual keyboard—tightly arranged in a touch screen, a user, in pressing a target object, is likely to accidently option objects surrounding the target object and get an unexpected result.

In addition, because prior art touch control methods use the transmission of the touch coordinate to activate an object function, as a result, the prior art touch control methods can only make a touch event correspond to a specific function, and not able to use a single touch to activate multiple object functions and thereby provide a vector or 3D control mechanism.

To solve the foregoing problems, the present invention proposes a novel touch control method and system, which can improve the efficiency in processing a touch operation and provide novel touch control functions by utilizing an intelligent GUI touch control mechanism.

SUMMARY OF THE INVENTION

One objective of the present invention is to disclose an intelligent GUI touch control method, which can wisely determine at least one target object to solve the problem of having accidently touched non-target objects, or can provide a vector or 3D operation function.

Another objective of the present invention is to disclose an intelligent GUI touch control system, which can wisely determine at least one target object to solve the problem of having accidently touched non-target objects, or can provide a vector or 3D operation function.

To attain the foregoing objectives, an intelligent GUI touch control method is proposed, the method including the steps of:

generating at least one masking plane according to a GUI, wherein the GUI has at least one option object, the masking plane has at least one masking block corresponding to the at least one option object, the masking block has a plurality of sub-blocks, and each of the sub-blocks has a weighting coefficient;

reading a sensed data array from a touch panel, wherein the sensed data array has a sensed value distribution over a touch plane, used for conveying touch information of the touch plane; and performing a weighting operation according to the at least one masking plane and the sensed data array, so as to make each of the at least one option object correspond to at least one weighted value; and determining at least one target object among the at least one option object according to the at least one weighted value.

Preferably, the weighting coefficient is a non-uniform function over the su b-blocks.

Preferably, the non-uniform function has a high weighting coefficient region and a low weighting coefficient region, wherein the average value of the high weighting coefficient region is higher than that of the low weighting coefficient region, so as to make the sensed data array have higher weighting values in the regions corresponding to the high weighting coefficient region, and lower weighting values in the regions corresponding to the low weighting coefficient region, and thereby provide a touch discrimination effect, or a vector operation function.

Preferably, the weighting operation includes a structure altering procedure, used for altering the structure of the at least one masking plane and the structure of the sensed data array.

Preferably, the touch panel has a touch sensor array of resistive type, capacitive type, surface acoustic wave type, or electromagnetic type.

To attain the foregoing objectives, an intelligent GUI touch control system is proposed, the system including:

a masking plane generation unit, used for generating at least one masking plane according to a GUI, wherein the GUI has at least one option object, the masking plane has at least one masking block corresponding to the at least one option object, the masking block has a plurality of sub-blocks, and each of the sub-blocks has a weighting coefficient; and a weighting operation and touch determination unit, used for executing a touch processing procedure, including: reading a sensed data array from a touch panel, wherein the sensed data array, having a sensed value distribution over a touch plane, is used for conveying touch information of the touch plane; performing a weighting operation according to the sensed data array and the at least one masking plane, so as to make each of the at least one option object correspond to at least one weighted value; and determining at least one target object among the at least one option object according to the at least one weighted value.

Preferably, the weighting coefficient is a non-uniform function over the su b-blocks.

Preferably, the non-uniform function has a high weighting coefficient region and a low weighting coefficient region, wherein the average value of the high weighting coefficient region is higher than that of the low weighting coefficient region, so as to make the sensed data array have higher weighting values in the regions corresponding to the high weighting coefficient region, and lower weighting values in the regions corresponding to the low weighting coefficient region, and thereby provide a touch discrimination effect, or a vector operation function.

Preferably, the touch processing procedure further includes a structure altering procedure, used for altering the structure of the at least one masking plane and the structure of the sensed data array.

Preferably, the touch panel has a touch sensor array of resistive type, capacitive type, surface acoustic wave type, or electromagnetic type.

Preferably, the intelligent GUI touch control system further includes an object function execution unit, used for executing an object function under the control of the weighting operation and touch determination unit.

Preferably, the object function is playing a film, playing music, displaying figures, or connecting to a website.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiments of the invention.

Figure 1:
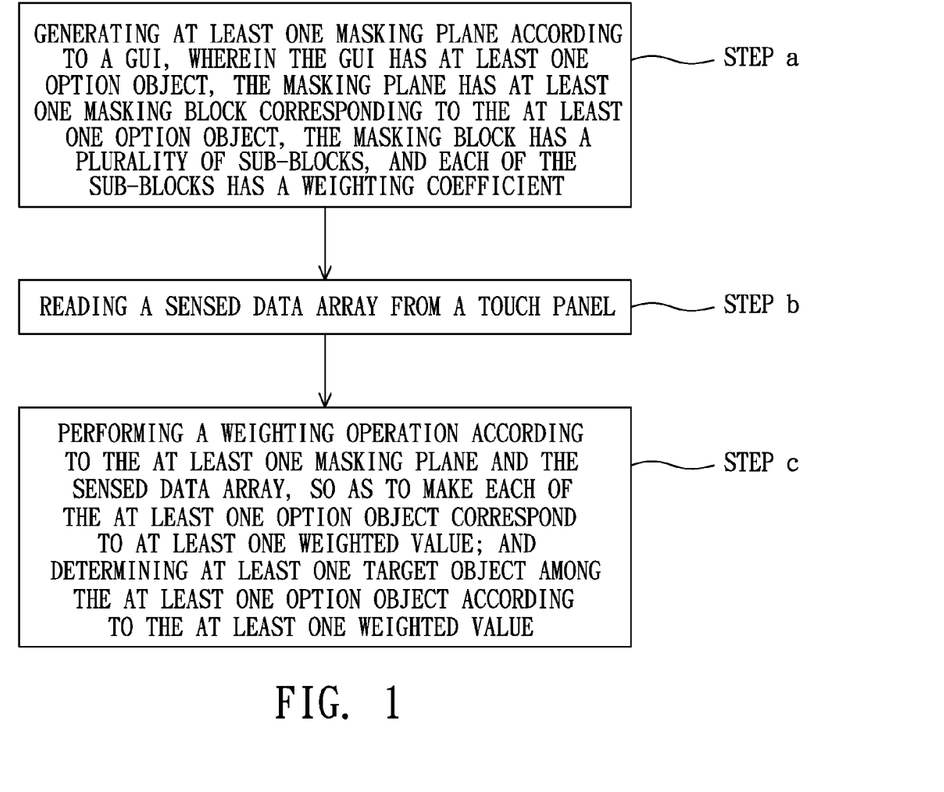
FIG. 1 illustrates the flowchart of an intelligent GUI touch control method according to a preferred embodiment of the present invention.

Please refer to FIG. 1, which illustrates the flowchart of an intelligent GUI touch control method according to a preferred embodiment of the present invention. As illustrated in FIG. 1, the method includes the steps of: generating at least one masking plane according to a GUI, wherein the GUI has at least one option object, the masking plane has at least one masking block corresponding to the at least one option object, the masking block has a plurality of sub-blocks, and each of the sub-blocks has a weighting coefficient (step a); reading a sensed data array from a touch panel (step b); and performing a weighting operation according to the at least one masking plane and the sensed data array, so as to make each of the at least one option object correspond to at least one weighted value; and determining at least one target object among the at least one option object according to the at least one weighted value (step c).

In step a, when the at least one masking plane is composed of a single plane, it is used for generating a one dimension masking effect; when the at least one masking plane is composed of multiple planes, it is used for generating a multi dimension masking effect. Besides, the weighting coefficient is preferably a non-uniform function over the sub-blocks, which has for example but not limited to a high weighting coefficient region and a low weighting coefficient region, with the average of the high weighting coefficient region being higher than that of the low weighting coefficient region.

In step b, the touch panel has a touch sensor array of resistive type, capacitive type, surface acoustic wave type, or electromagnetic type, and the sensed data array has a sensed value distribution over a touch plane, used for conveying touch information of the touch plane.

In step c, the weighting operation will assign a higher weighting value to the regions of the sensed data array corresponding to the high weighting coefficient region, and a lower weighting value to the regions of the sensed data array corresponding to the low weighting coefficient region, so as to provide a touch discrimination effect, or a vector operation function.

Besides, to facilitate the execution of the weighting operation, the weighting operation can include a structure altering procedure to alter the structure of the at least one masking plane and the structure of the sensed data array—for example, expanding the sensed data array from 64×64 to 160×96, and reducing the at least one masking plane from 1280×768 to 160×96; or reducing the sensed data array from 1280×768 to 160×96, and reducing the at least one masking plane from 1280×768 to 160×96.

Figure 2A:
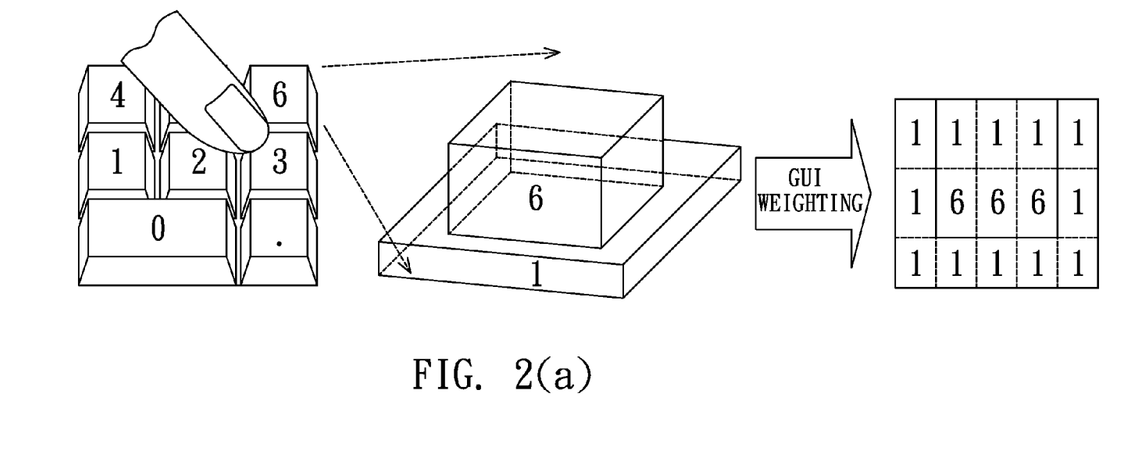
FIG. 2(a) illustrates an application of the present invention's intelligent GUI touch control method in providing a masking block for a button object of a 3D GUI keyboard.

Please refer to FIG. 2(a), which illustrates an application of the present invention's intelligent GUI touch control method in providing a masking block for a button object of a 3D GUI keyboard. As illustrated in FIG. 2(a), the masking block has 15 sub-blocks, wherein, 3 sub-blocks in the middle part—the weighting coefficients of which are set at 6—are used to form the high weighting coefficient region; 12 sub-blocks around the middle part—the weighting coefficients of which are set at 1—are used to form the low weighting coefficient region.

Figure 2B:
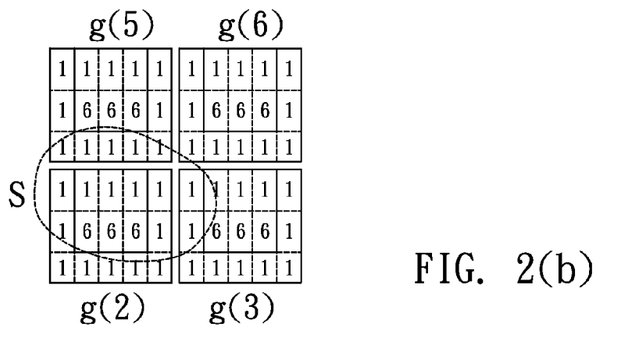
FIG. 2(b) illustrates an application of the present invention's intelligent GUI touch control method in using the masking blocks of FIG. 2(a) to perform the weighting operation.

Please refer to FIG. 2(b), which illustrates an application of the present invention's intelligent GUI touch control method in using the masking blocks of FIG. 2(a) to perform the weighting operation. As illustrated in FIG. 2(b), a touched region S of a sensed data array overlaps masking blocks g(2), g(3), g(5), and g(6), and the touched region S covers the high weighting coefficient region of g(2). As a result, the weighted value generated in the weighting operation on g(2) will be higher than those generated on g(3), g(5), and g(6), and button "2" will thereby be determined as a target object. That is, the intelligent GUI touch control method of the present invention can wisely determine a target button at the instance where buttons around the target button are accidently touched when a user is pressing the target button.

Figure 3A:
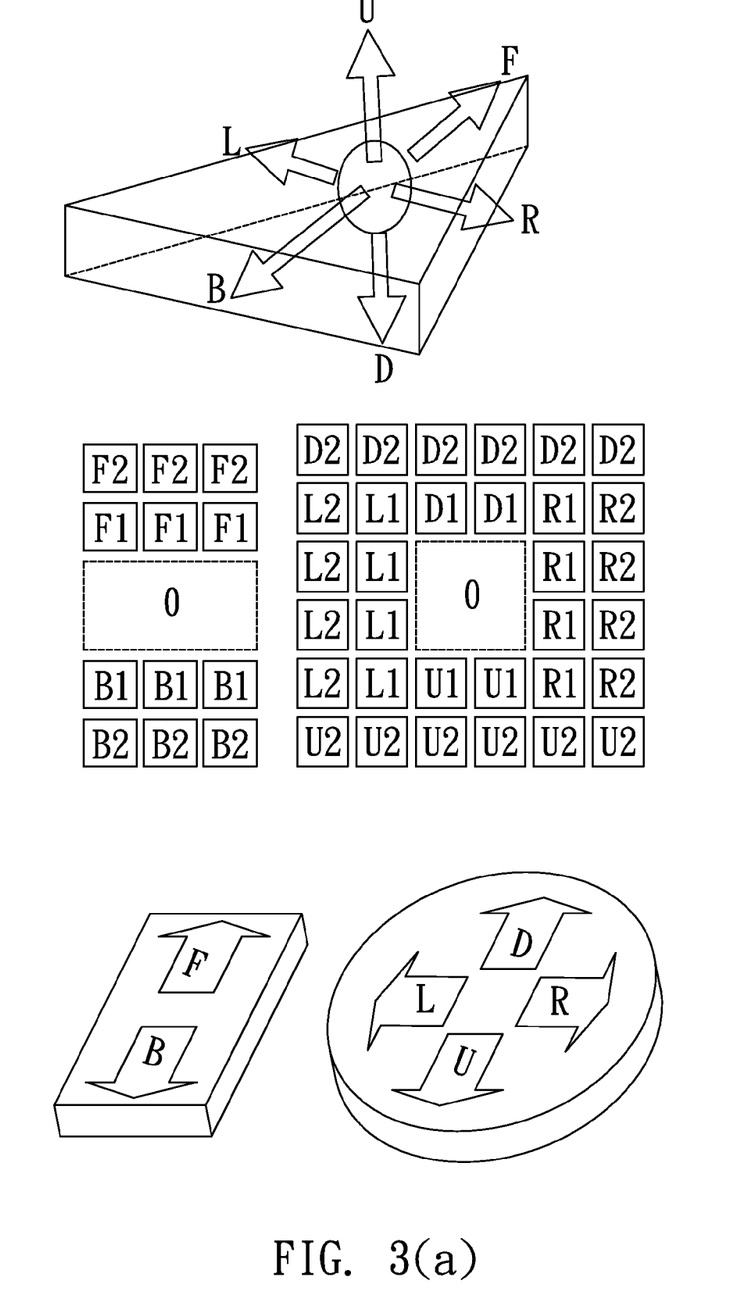
FIG. 3(a) illustrates an application of the present invention's intelligent GUI touch control method in providing two masking blocks for two button objects of a 3D GUI flight console.

Please refer to FIG. 3(a), which illustrates an application of the present invention's intelligent GUI touch control method in providing two masking blocks for two button objects of a 3D GUI flight console. As illustrated in FIG. 3(a), the 3D GUI flight console provides a first button and a second button for a user to control a triangle flying object, wherein the first button has an "F" option (forward) and a "B" option (backward), and the second button has a "D" option (downward), an "R" option (rightward), a "U" option (upward), and an "L" option (leftward). The "F" option has 6 sub-blocks with the weighting coefficients set at F1, F1, F1, F2, F2, F2; The "B" option has 6 sub-blocks with the weighting coefficients set at B1, B1, B1, B2, B2, B2; The "D" option has 8 sub-blocks with the weighting coefficients set at D1, D1, D2, D2, D2, D2, D2, D2; The "R" option has 8 sub-blocks with the weighting coefficients set at R1, R1, R1, R1, R2, R2, R2, R2; The "U" option has 8 sub-blocks with the weighting coefficients set at U1, U1, U2, U2, U2, U2, U2, U2; The "L" option has 8 sub-blocks with the weighting coefficients set at L1, L1, L1, L1, L2, L2, L2, L2.

Figure 3B:
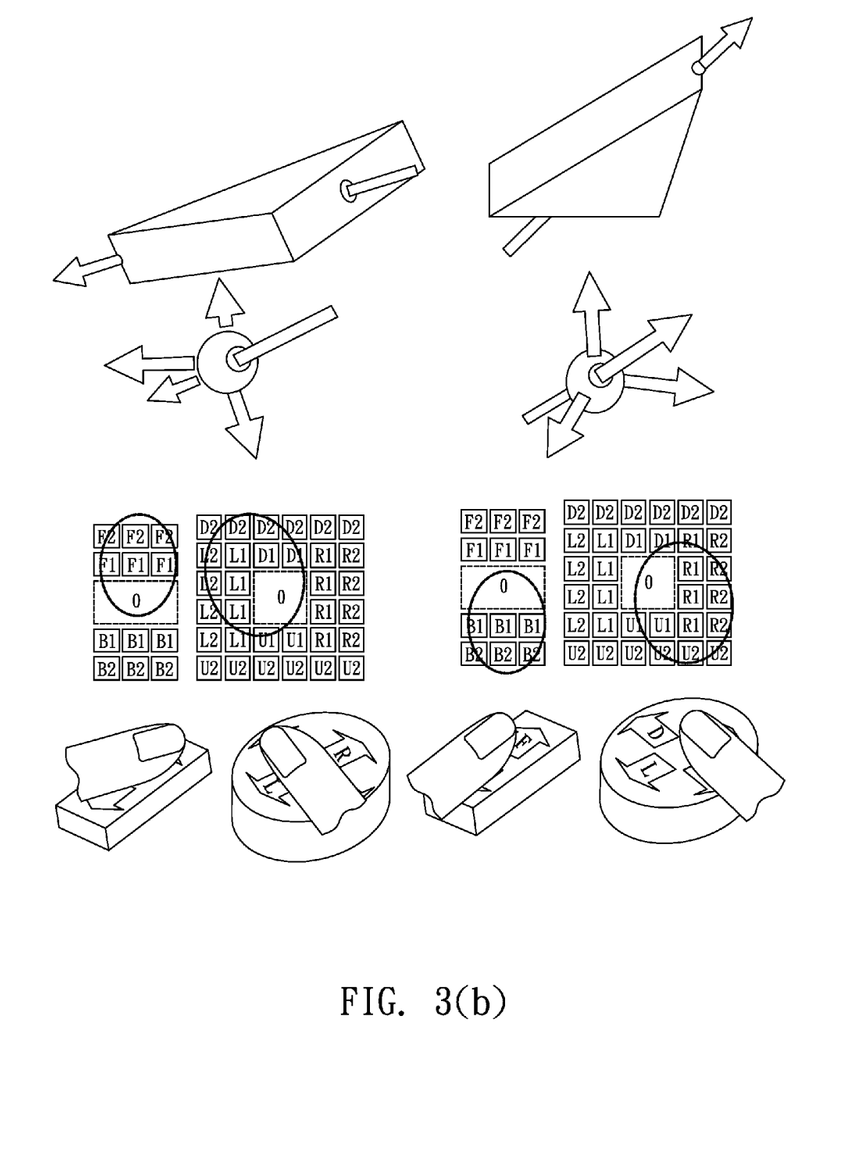
FIG. 3(b) illustrates an application of the present invention's intelligent GUI touch control method in using the masking blocks of FIG. 3(a) to perform the weighting operation.

Please refer to FIG. 3(b), which illustrates an application of the present invention's intelligent GUI touch control method in using the masking blocks of FIG. 3(a) to perform the weighting operation. As illustrated in FIG. 3(b), when a user touches the "F" option of the first button, a touched region of a sensed data array will be over the masking blocks of the "F" option, and the weighting operation will generate an effective weighted value over the masking blocks of the "F" option, so as to make the "F" option determined as a target object, and thereby make the triangle flying object move forward.

When a user touches part of the "D" option and part of the "L" option of the second button, a touched region of a sensed data array will be over part of the masking blocks of the "D" option, and part of the masking blocks of the "L" option, and the weighting operation will generate an effective weighted value over the masking blocks of the "D" option and another effective weighted value over the masking blocks of the "L" option, so as to make the "D" option and the "L" option determined as target objects, and thereby make the triangle flying object move left and down.

When a user touches the "B" option of the first button, a touched region of a sensed data array will be over the masking blocks of the "B" option, and the weighting operation will generate an effective weighted value over the masking blocks of the "B" option, so as to make the "B" option determined as a target object, and thereby make the triangle flying object move backward.

When a user touches part of the "R" option and part of the "U" option of the second button, a touched region of a sensed data array will be over part of the masking blocks of the "R" option, and part of the masking blocks of the "U" option, and the weighting operation will generate an effective weighted value over the masking blocks of the "R" option and an effective weighted value over the masking blocks of the "U" option, so as to make the "R" option and the "U" option determined as target objects, and thereby make the triangle flying object move up and right.

When the first button and the second button are operated simultaneously, the triangle flying object will have a moving direction combined by forward/backward, upward/downward, and leftward/rightward, that is, the present invention's intelligent GUI touch control method can provide a vector operation function.

Figure 4:
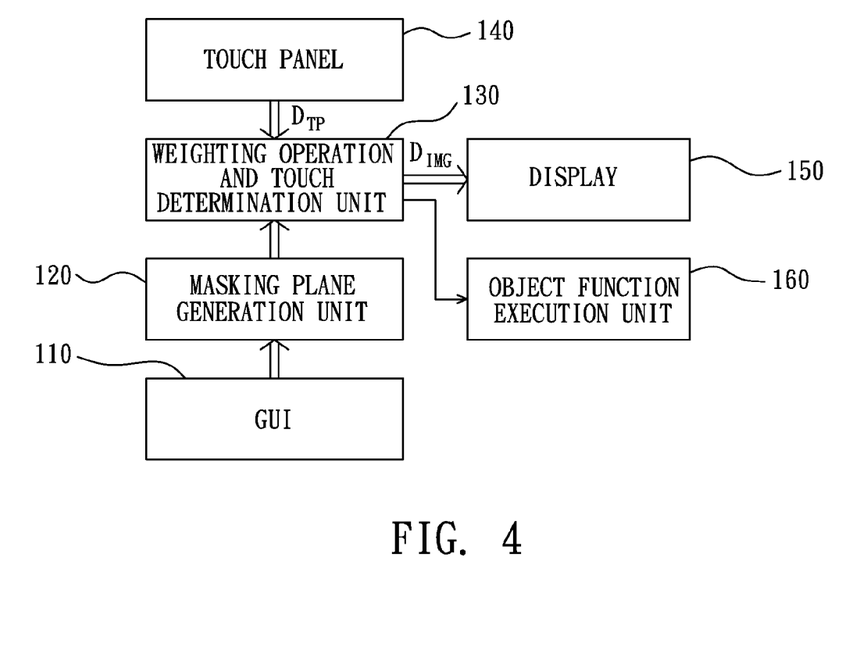
FIG. 4 illustrates the block diagram of the intelligent GUI touch control system according to a preferred embodiment of the present invention.

According to the foregoing specification, the present invention further proposes an intelligent GUI touch control system. Please refer to FIG. 4, which illustrates the block diagram of the intelligent GUI touch control system according to a preferred embodiment of the present invention. As illustrated in FIG. 4, the system includes a GUI 110, a masking plane generation unit 120, a weighting operation and touch determination unit 130, a touch panel 140, a display 150, and an object function execution unit 160.

The GUI 110 is a graphical user interface, including a background area corresponding to a touch plane of the touch panel 140. The background area can accommodate at least one option object.

The masking plane generation unit 120 generates at least one masking plane according to the GUI 110. The masking plane has at least one masking block corresponding to the at least one option object. The masking block has a plurality of sub-blocks, and each of the sub-blocks has a weighting coefficient. When the at least one masking plane is composed of a single plane, it is used to provide a one-dimension masking effect; when the at least one masking plane is composed of multiple planes, it is used to provide a multi-dimension masking effect. In addition, the weighting coefficient is preferably a non-uniform function over the sub-blocks. The non-uniform function has for example but not limited to a high weighting coefficient region and a low weighting coefficient region, wherein the average value of the high weighting coefficient region is higher than that of the low weighting coefficient region.

The weighting operation and touch determination unit 130 is used for executing a touch processing procedure, including: reading a sensed data array from the touch panel 140, wherein the sensed data array, having a sensed value distribution over a touch plane, is used for conveying touch information of the touch plane; performing a weighting operation according to the sensed data array and the at least one masking plane of the masking plane generation unit 120, so as to make each of the at least one option object correspond to at least one weighted value; and determining at least one target object among the at least one option object according to the at least one weighted value. The weighting operation will assign a higher weighting value to the regions of the sensed data array corresponding to the high weighting coefficient region, and a lower weighting value to the regions of the sensed data array corresponding to the low weighting coefficient region, so as to provide a touch discrimination effect, or a vector operation function.

In addition, to facilitate the execution of the weighting operation, the touch processing procedure can further includes a structure altering procedure to alter the structure of the at least one masking plane and the structure of the sensed data array—for example, expanding the sensed data array from 64×64 to 160×96, and reducing the at least one masking plane from 1280×768 to 160×96; or reducing the sensed data array from 1280×768 to 160×96, and reducing the at least one masking plane from 1280×768 to 160×96.

The touch panel 140 has a touch sensor array of resistive type, capacitive type, surface acoustic wave type, or electromagnetic type, and outputs a sensed data array via an output port $D_{TP}$.

The display 150 can be a liquid crystal display, an organic/non-organic LED display, or an e-paper display.

The object function execution unit 160 is used for executing an object function—like playing a film, playing music, displaying figures, or connecting to a website—under the control of the weighting operation and touch determination unit 130.

In addition, a CPU/GPU is preferably used to execute the functions of the masking plane generation unit 120 and the weighting operation and touch determination unit 130, so as to relieve the workload of the touch panel 140, and simplify the architecture of the touch panel 140. Through the powerful operation capability of the CPU/GPU, the intelligent GUI touch control system of the present invention can perform related image processing procedures in a high speed to wisely determine at least one target object, or provide a vector operation function.

In conclusion, the intelligent GUI touch control method and system of the present invention can relieve the workload of a touch panel, simplify the architecture of the touch panel, wisely determine at least one target object to solve the problem caused by accidently touched non-target objects, and provide a vector operation function to realize a 3D operation. Compared to the prior art touch control method and system, the present invention possesses superior advantages.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. An intelligent GUI touch control method, comprising the steps of:
using a processor to generate at least one masking plane according to a GUI, wherein said GUI has at least one option object, said masking plane has at least one masking block corresponding to said at least one option object, said masking block has a plurality of sub-blocks, and each of said sub-blocks has a weighting coefficient;
reading a sensed data array from a touch panel with the processor, wherein said sensed data array has a sensed value distribution over a touch plane, and is made up of a set of data derived from sensed values of a plurality of sensors of said touch plane;
performing a weighting operation with the processor according to a set of data from said weighting coefficients of said at least one masking plane and a set of data from said sensed data array respectively, so as to make each of said at least one option object correspond to at least one weighted value, and determine at least one target object among said at least one option object according to said at least one weighted value, wherein said weighting operation includes a structure altering procedure for altering the structure of said sensed data array and for altering the at least one masking plane so that the structure of the sensed data array matches the structure of the at least one masking plane by adjusting a size of said sensed data array and a size of said at least one masking plane to a same size; and
wherein said processor executes the functions of generating at least one masking plane, processing touch information, and performing a weighing operation so as to relieve the workload of the touch panel.

2. The intelligent GUI touch control method as claim 1, wherein said weighting coefficient is a non-uniform function over said sub-blocks.

3. The intelligent GUI touch control method as claim 2, wherein said non-uniform function has a high weighting coefficient region and a low weighting coefficient region, and the average value of said high weighting coefficient region is higher than that of said low weighting coefficient region.

4. The intelligent GUI touch control method as claim 1, wherein said touch panel comprises a touch sensor array of resistive type, capacitive type, surface acoustic wave type, or electromagnetic type.

5. The intelligent GUI touch control method as claim 3, wherein said weighting operation is used for making said sensed data array have higher weighting values in the regions corresponding to said high weighting coefficient region, and lower weighting values in the regions corresponding to said low weighting coefficient region, and thereby provide a touch discrimination effect, or a vector operation function.

6. An intelligent GUI touch control system, comprising:
a masking plane generation unit, used for generating at least one masking plane according to a GUI, wherein said GUI has at least one option object, said masking plane has at least one masking block corresponding to said at least one option object, said masking block has a plurality of sub-blocks, and each of said sub-blocks has a weighting coefficient;
a weighting operation and touch determination unit, used for executing a touch processing procedure, including: reading a sensed data array from a touch panel, wherein said sensed data array, having a sensed value distribution over a touch plane, made up of a set of data derived from sensed values of a plurality of sensors of said touch plane; performing a weighting operation according to a set of data from said sensed data array and a set of data from said weighting coefficients of said at least one masking plane respectively, so as to make each of said at least one option object correspond to at least one weighted value; and determining at least one target object among said at least one option object according to said at least one weighted value; wherein said weighting operation includes a structure altering procedure for altering the structure of said sensed data array and for altering the at least one masking plane so that the structure of the sensed data array matches the structure of the at least one masking plane by adjusting a size of said sensed data array and a size of said at least one masking plane to a same size; and
a processor executing the functions of generating at least one masking plane, processing touch information, and performing a weighing operation so as to relieve the workload of the touch panel.

7. The intelligent GUI touch control system as claim 6, wherein said weighting coefficient is a non-uniform function over said sub-blocks.

8. The intelligent GUI touch control system as claim 7, wherein said non-uniform function has a high weighting coefficient region and a low weighting coefficient region, and the average value of said high weighting coefficient region is higher than that of said low weighting coefficient region.

9. The intelligent GUI touch control system as claim 6, wherein said touch panel comprises a touch sensor array of resistive type, capacitive type, surface acoustic wave type, or electromagnetic type.

10. The intelligent GUI touch control system as claim 8, wherein said weighting operation is used for making said sensed data array have higher weighting values in the regions corresponding to said high weighting coefficient region, and lower weighting values in the regions corresponding to said low weighting coefficient region, and thereby provide a touch discrimination effect, or a vector operation function.

11. The intelligent GUI touch control system as disclosed in claim 6, further comprising an object function execution unit, used for executing an object function under the control of said weighting operation and touch determination unit.

12. The intelligent GUI touch control system as disclosed in claim 11, wherein said object function includes playing a film, playing music, displaying figures, and connecting to a website.

13. An intelligent GUI touch control system, comprising:
a masking plane generation unit, used for generating a plurality of masking planes according to a GUI for providing a multi-dimension masking effect, wherein said GUI has at least one option object, each of said plurality of masking planes has at least one masking block corresponding to said at least one option object, said masking block has a plurality of sub-blocks, and each of said sub-blocks has a weighting coefficient;
a touch panel, used for outputting a sensed data array, wherein said sensed data array, having a sensed value distribution over a touch plane, made up of a set of data derived from sensed values of a plurality of sensors of said touch plane;
a weighting operation and touch determination unit, used for executing a touch processing procedure, including: reading said sensed data array from said touch panel; performing a weighting operation according to a set of data from said sensed data array and a set of data from said weighting coefficients of said plurality of masking planes respectively, so as to make each of said at least one option object correspond to at least one weighted value; and determining at least one target object among said at least one option object according to said at least one weighted value; wherein said weighting operation includes a structure altering procedure for altering the structure of said sensed data array and for altering the plurality of masking planes so that the structure of the sensed data array matches the structure of the plurality of masking planes by adjusting a size of said sensed data array and a size of said plurality of masking planes to a same size; and a processor for executing the functions of generating at least one masking plane, processing touch information, and performing a weighing operation so as to relieve the workload of the touch panel.

14. The intelligent GUI touch control system as claim 13, wherein said weighting coefficient is a non-uniform function over said sub-blocks.

15. The intelligent GUI touch control system as claim 14, wherein said non-uniform function has a high weighting coefficient region and a low weighting coefficient region, and the average value of said high weighting coefficient region is higher than that of said low weighting coefficient region.

16. The intelligent GUI touch control system as claim 15, wherein said weighting operation is used for making said sensed data array have higher weighting values in the regions corresponding to said high weighting coefficient region, and lower weighting values in the regions corresponding to said low weighting coefficient region, and thereby provide a touch discrimination effect, or a vector operation function.

17. The intelligent GUI touch control system as disclosed in claim 13, further comprising an object function execution unit, used for executing an object function under the control of said weighting operation and touch determination unit.

* * * * *